United States Patent

Dermitzakis

[11] Patent Number: 5,676,897
[45] Date of Patent: Oct. 14, 1997

[54] DRIPLINE DUCT WITH INTERNALLY LOCATED EMITERS AND MANUFACTURE PROCESS

[76] Inventor: Emmanuil Dermitzakis, 16-18 Papada St., Athens 11525, Greece

[21] Appl. No.: 390,670

[22] Filed: Feb. 17, 1995

Related U.S. Application Data

[62] Division of Ser. No. 858,966, May 13, 1992, abandoned.

[30] Foreign Application Priority Data

Oct. 3, 1990 [GR] Greece .................. 900100727

[51] Int. Cl.$^6$ .................................................. B29C 47/02
[52] U.S. Cl. .............. 264/167; 264/171.11; 264/171.27; 264/209.3; 239/542
[58] Field of Search .................... 264/171.11, 171.27, 264/209.3, 149, 150; 239/542

[56] References Cited

U.S. PATENT DOCUMENTS

| | | | |
|---|---|---|---|
| 3,895,085 | 7/1975 | Suzuki | 264/171.11 X |
| 4,366,926 | 1/1983 | Nehouder | 239/542 |
| 5,234,379 | 6/1994 | Eckstein | 239/542 X |
| 5,282,916 | 2/1994 | Bloom | 239/542 X |
| 5,324,371 | 6/1994 | Mehoudar | 239/542 X |

FOREIGN PATENT DOCUMENTS 2395915  3/1979  France .................. 264/209

*Primary Examiner*—Kevin Weldon
*Attorney, Agent, or Firm*—Webb Ziesenheim Bruening Logsdon Orkin & Hanson, P.C.

[57] ABSTRACT

The dripline duct with internally attached emitter is used for irrigation. The duct is plastic and continuous, but does not have constant cross-section along its total length. The emitter may be simple, namely only having internally a meandering stroke or other form of stroke for adjusting the supply, or may be auto-adjusting for securing constant supply at a particular area of water pressures.

The emitters are entered one by one in the interior of the duct at its production phase and are covered almost totally by the wall of the duct with is obviously swollen at this point, holding firmly the emitter in its interior. The cross-section of the duct is completely free along the total length. The emitter may also have an elevated water outflow end-tube.

6 Claims, 2 Drawing Sheets

DRIPLINE DUCT WITH INTERNALLY LOCATED EMITERS AND MANUFACTURE PROCESS

The present application is a divisional application filed under 37 c.r.f. 160, the serial number of the parent application is Ser. No. 07/858,966 filed on May 13, 1992 now abandoned.

BACKGROUND OF THE INVENTION

1. Field of the Invention

The invention concerns a method for producing driplines comprising a duct and internally and at spaced apart intervals located emitters.

2. Description of the Prior Art

Document U.S. Pat. No. 5,324,371 (Mehoudar) discloses a method for the manufacture of dripline ducts with constant cross-section. In accordance with this method the emitters are accelerated along a driver by a pusher, in order to achieve the velocity, that the duct has as it passes through the calibration unit provided downstream of the extrusion head. At this stage the emitters contact the inner surface of the wall of the duct, when the duct is still in a semi-molten state, and it is pushed against the wall of the duct, in order to achieve its attachment thereto. However this contact produces high forces, which act on the wall of the warm extruded duct, which is pressed between the calibration unit and the cool emitter supported by the driver on which it slides and by the pusher. At this exact point of disfiguration, the extruded duct "collides" with the stable calibration unit on which it is then pulled. This collision is violent enough because the produced ducts move at 30–50 m/min. The control of the production procedure and the automatic co-ordination of the velocities of emitter entering and duct are difficult, because of the high velocities, the simultaneous action of many constant forces in minimum time and the simultaneous external sliding of the duct on the stable calibration unit and internal sliding of the emitter along the internal driver. These problems bear consequences on the quality of attachment.

The object of the invention is a method of production of a dripline with internally located emitters, which does not encounter the problems mentioned above.

SUMMARY OF THE INVENTION

The object of the invention is achieved by exerting a radial force to the emitter in order to weld in the wall of the duct. Such a force may be produced by moving the driver or the calibration unit transversally with respect to the axis of the duct. The method may be used in production lines with or without a calibration unit downstream from the extrusion head.

According to the invention the method of production comprising the following steps of providing an emitter in the interior of the duct as the duct is extruded from the extrusion head, exerting a radial force to the emitter by changing the height of the radial clearance between the inner surface of the wall of the duct and a driver provided within the duct at a distance from the inner surface of the wall of the duct, and carrying a periodic motion transversely with respect to the axis of the duct, to press and attach the emitter to the inner surface of the wall of the duct.

Alternatively, according to the invention the method of production comprises the steps of providing an emitter in the interior of the duct as the duct is extruded from the extrusion head, exerting a radial force to the emitter by changing the height of the radial clearance between the inner surface of the wall of the duct and a driver provided within the duct at a distance from the inner surface of the wall of the duct, and carrying a periodic motion transversely with respect to the axis of the duct, to press and attach the emitter to the inner surface of the wall of the duct.

DESCRIPTION OF THE PREFERRED EMBODIMENTS

Figure 1:
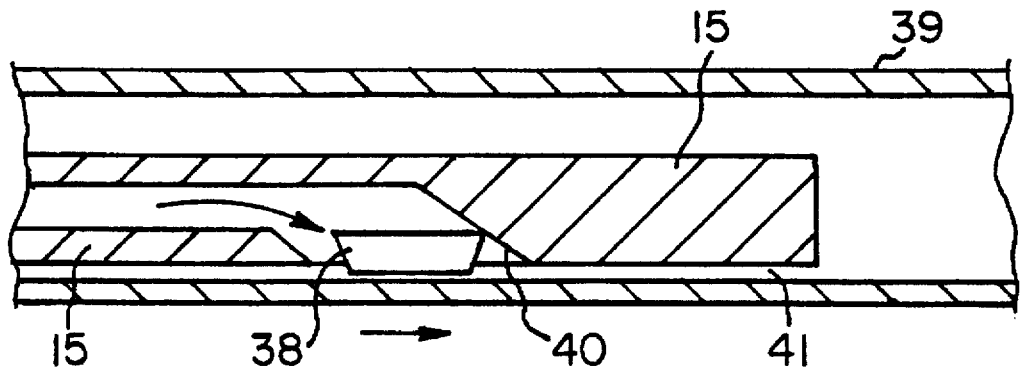
FIG. 1 and FIG. 2 shows the production method of a dripline with internally located emitters.
Figure 2:
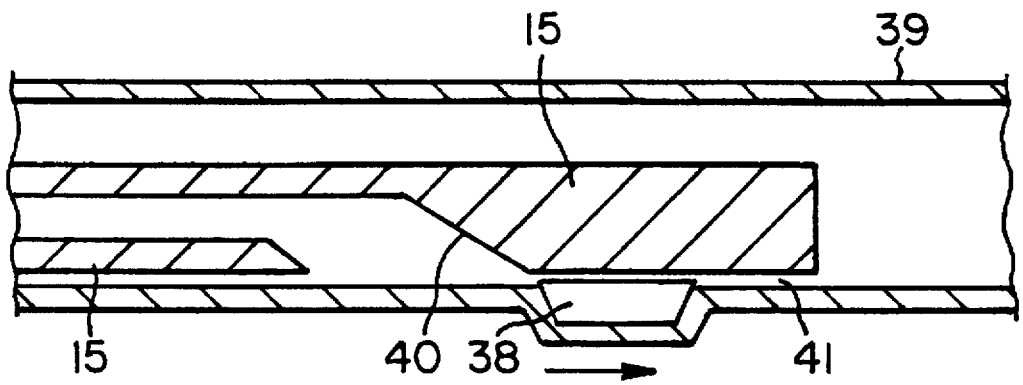
Figure 3:
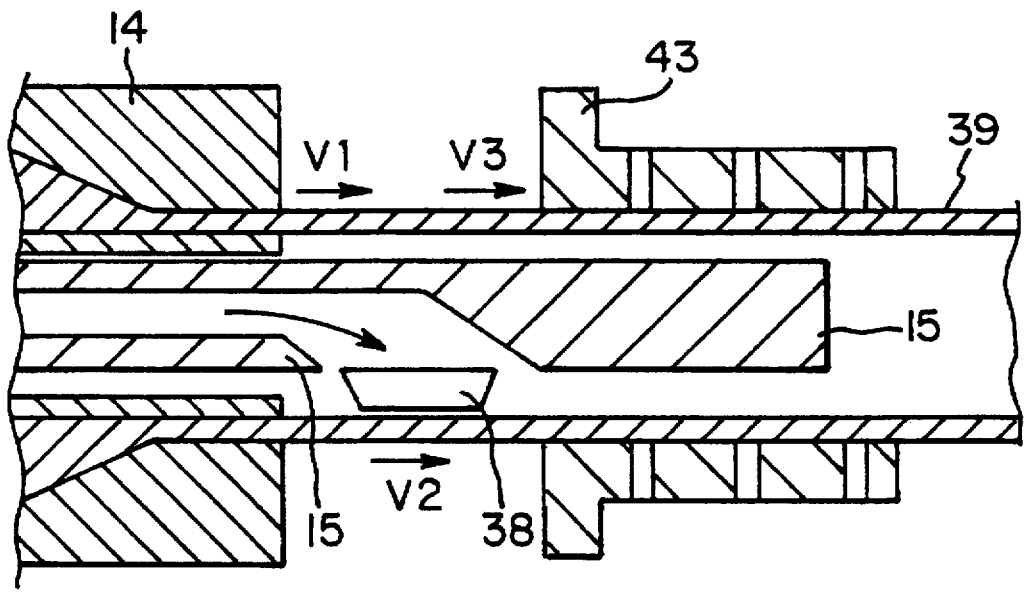
FIG. 3 and FIG. 4 shows one of the applications of the method for the entrance of the emitter in the interior of a dripline duct of constant cross-section.
Figure 4:
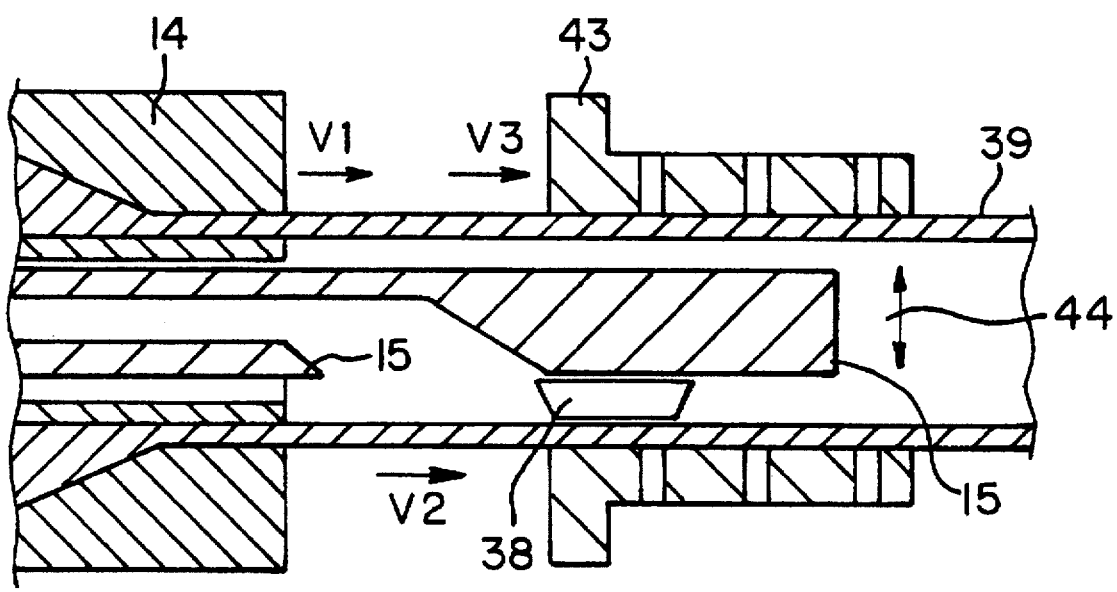

The emitter 38 is simply ejected in the interior of the produced duct 39 and it is initially slightly attached on the warm duct. Then the emitter 38 is pressed outwards together with the duct by an inclined level 40 or a kinetic mechanism of the internal driver 15. In this way the emitter moves outwards and horizontally on the one hand and vertically and ray-like on the other, swelling the duct 39 which covers it.

At this point, we will mention a method for the manufacture of a dripline duct with constant cross-section: The emitter 38 is not linearly accelerated in order to achieve the particular velocity V3 of the entrance of the duct 39 in the configuration section 43, but it is simply ejected in any velocity V and at any point between the extruder head and caliber in the interior of the produced duct in the angular head, where it is slightly attached in the interior of the duct. The linear velocity V2 of the duct at the point of contact with the emitter and the velocity of the emitter itself may be whatsoever and does not depend on the linear velocity V1, with which the produced duct exits from the head 14 of the extruder, or the linear velocity v3 with which it enters in the configuration system (caliber) 43. Simply, if $V1<V3$, then $V1<V2<V3$, while if $V1=V3$, then $V1=V2=V3$. After the emitter 38 enters with duct 39 in the configuration system 43, always moving towards the production of the duct, where it is compressed between the internal driver 15 and caliber 43 and attached on one of its surfaces on the internal surface of the warm duct. In this way the duct has a continuous and constant cross-section. The attachment of the emitter is not achieved by its simple and stable compression by the internal driver, but is also reinforced by palpitating, vibrating or percussioning movements 44 of the internal driver 15. These vibrating movements 44 permit the emitter to be driven by the duct itself and pass without shocks between the stable caliber 43 and the driver 15 and to be compressed vertically to its movement between them, achieving better adhesion. This is due to the fact that, because of this vertical palpitating movement 44 of the driver 15 or part of it, the forces do not have constant intensity and the void between the driver 15 and caliber 43 is increased and decreased all the time. Moreover, other methods may be used apart from the vibrations in order to achieve this periodical increase and decrease of the void between the driver 15 and the caliber 43. This decrease of the void is connected with increase and decrease of the pressures on the emitter. Moreover, the emitter could be supported at its movement and additionally pushed by a pushing mechanism or the caliber itself may perform palpitating movements.

The emitter 38 is simply ejected in the interior of the produced duct 39 and it is slightly attached on the warm duct. Then, the emitter 38 is pressed outwards together with the duct by an inclined level 40 or a kinetic mechanism of the internal driver. In this way the emitter moves outwards and horizontally on the one hand and vertically and ray-like on the other, swelling the duct 39 which covers it.

At this point, we will mention a method for the manufacture of a dripline duct with constant cross-section:

The emitter 38 is not linearly accelerated in order to achieve the particular velocity V3 of the entrance of the duct 39 in the configuration section 43, but it is simply ejected in any velocity V and at any point between the extruder head and caliber in the interior of the produced duct in the angular head, where it is slightly attached in the interior of the duct. The linear velocity V2 of the duct at the point of contact with the emitter and the velocity of the emitter itself may be whatsoever and does not depend on the linear velocity V1, with which the produced duct exits from the head 14 of the extruder, or the linear velocity V3, with which it enters in the configuration system (caliber) 43. Simply, if V1<V3, then V1<V2<V3, while if V1=V3, then V1=V2=V3. After the emitter 38 enters with duct 39 in the configuration system 43, always moving towards the production of the duct, where it is compressed between the internal driver 15 and caliber 43 and attached on one of its surfaces on the internal surface of the warm duct. In this way the duct has a continuous and constant cross-section. The attachment of the emitter is not achieved by its simple and stable compression by the internal driver, but is also reinforced by palpitating, vibrating or percussioning movements 44 of the internal driver 15. These vibrating movements 44 permit to the emitter to be driven by the duct itself and pass without shocks between the stable caliber 43 and the driver 15 and to be compressed vertically to its movement between them, achieving better adhesion. This is due to the fact that, because of this vertical palpitating movement 44 of the driver 15 or part of it, the forces do not have constant intensity and the void between the driver 15 and the caliber 43 is increased and decreased all the time. Moreover, other methods may be used apart from the vibrations in order to achieve this periodical increase and decrease of the void between the driver 15 and the caliber 43. This decrease and increase of the void is connected with increase and decrease of the pressures on the emitter. Moreover, the emitter could be supported at its movement and additionally pushed by a pushing mechanism or the caliber itslef may perform palpitating movements.

I claim:

1. Method of production of a dripline consisting of a duct and individual emitters, which emitters are attached to the warm inner surface of the wall of the duct during extrusion of the duct from the extrusion head, the method of production comprising the following steps:

provide an emitter in the interior of the duct as the duct is extruded from the extrusion head, exert a radial force to the emitter by changing the height of the radial clearance between the inner surface of the wall of the duct and a driver provided within the duct at a distance from the inner surface of the wall of the duct, and carrying a periodic motion transversely with respect to the axis of the duct, to press and attach the emitter to the inner surface of the wall of the duct.

2. Method of production of a dripline according to claim 1, whereby the driver carries an impulsive movement to change the height of the clearance between the inner surface of the wall of the duct and the driver.

3. Method of production of a dripline according to claim 1, whereby the emitters are pressed in the inner surface of the wall of the duct against a calibration unit provided around the wall of the duct.

4. Method of production of a dripline according to claim 1, whereby the driver consists of a moving part, whereby the movement of the moving part changes the height of the clearance between the inner surface of the wall of the duct and the driver.

5. Method of production of a dripline consisting of a duct and individual emitters, which emitters are attached to the warm inner surface of the wall of the duct during extrusion of the duct from the extrusion head, the method of production comprising the following steps:

provide an emitter in the interior of the duct as the duct is extruded from the extrusion head, exert a radial force to the emitter by changing the height of the radial distance between the inner wall of the duct and a driver provided within the duct at a distance from the inner surface of the wall of the duct, by moving periodically a calibration unit located downstream from the extrusion head, transversely with respect to the axis of the duct, to press and attach the emitter to the inner surface of the wall of the duct.

6. Method of production of a dripline according to claims 1 or 5, whereby the height of the radial clearance between the driver and the inner surface of the wall of the duct is larger than the height of the emitter.

* * * * *